United States Patent
Hoffman et al.

(10) Patent No.: US 10,995,773 B2
(45) Date of Patent: May 4, 2021

(54) SYSTEM FOR USING PRESSURE EXCHANGER IN MUD PUMPING APPLICATION

(71) Applicant: Energy Recovery, Inc., San Leandro, CA (US)

(72) Inventors: Adam Rothschild Hoffman, San Francisco, CA (US); Joel Gay, San Ramon, CA (US); Farshad Ghasripoor, Berkeley, CA (US); David Deloyd Anderson, Castro Valley, CA (US); Jeremy Grant Martin, Oakland, CA (US)

(73) Assignee: Energy Recovery, Inc., San Leandro, CA (US)

( * ) Notice: Subject to any disclaimer, the term of this patent is extended or adjusted under 35 U.S.C. 154(b) by 527 days.

(21) Appl. No.: 15/722,996

(22) Filed: Oct. 2, 2017

(65) Prior Publication Data

US 2018/0094648 A1    Apr. 5, 2018

Related U.S. Application Data

(60) Provisional application No. 62/403,488, filed on Oct. 3, 2016.

(51) Int. Cl.
*F04F 13/00*     (2009.01)
*E21B 43/34*     (2006.01)
(Continued)

(52) U.S. Cl.
CPC ............ *F04F 13/00* (2013.01); *B01D 19/00* (2013.01); *B01D 21/262* (2013.01); *B01D 21/283* (2013.01); *E21B 21/06* (2013.01); *E21B 21/08* (2013.01); *E21B 43/34* (2013.01); *E21B 21/01* (2013.01); *E21B 21/065* (2013.01); *E21B 21/067* (2013.01)

(58) Field of Classification Search
CPC ....... F04F 13/00; B01D 19/00; B01D 21/262; B01D 21/285; E21B 21/06; E21B 21/08; E21B 21/01; E21B 21/066; E21B 21/068; E21B 43/34
USPC ...................................................... 166/358
See application file for complete search history.

(56) References Cited

U.S. PATENT DOCUMENTS 9,810,033 B1 * 11/2017 Shampine ............ E21B 21/001
2014/0262510 A1 * 9/2014 Beddoes ................ E21B 21/06
                                                              175/38

(Continued)

FOREIGN PATENT DOCUMENTS

CN      105114368 A     12/2015
WO      2015051316 A2    4/2015

(Continued)

OTHER PUBLICATIONS

International Search Report and Written Opinion for PCT/US2017/054927 dated Dec. 12, 2017; 11 pages.

*Primary Examiner* — Matthew R Buck
*Assistant Examiner* — Patrick F Lambe
(74) *Attorney, Agent, or Firm* — Lowenstein Sandler LLP

(57) ABSTRACT

A system includes a pump configured to pressurize a first fluid, and a pressure exchanger (PX). The PX is configured to receive a second fluid, to receive the pressurized first fluid, and to utilize the pressurized first fluid to pressurize the drilling mud for transport to a well.

20 Claims, 8 Drawing Sheets

(51) Int. Cl.
*E21B 21/06* (2006.01)
*B01D 19/00* (2006.01)
*B01D 21/26* (2006.01)
*B01D 21/28* (2006.01)
*E21B 21/08* (2006.01)
*E21B 21/01* (2006.01)

(56) References Cited

U.S. PATENT DOCUMENTS

| | | | |
|---|---|---|---|
| 2015/0096739 A1* | 4/2015 | Ghasripoor | E21B 43/267 |
| | | | 166/105 |
| 2016/0160889 A1* | 6/2016 | Hoffman | F04F 13/00 |
| | | | 60/487 |
| 2017/0058177 A1* | 3/2017 | Ramesh | G01N 11/04 |
| 2019/0145237 A1* | 5/2019 | Shampine | F04B 23/06 |
| | | | 60/39.45 |

FOREIGN PATENT DOCUMENTS

| | | |
|---|---|---|
| WO | 2016090201 A1 | 6/2016 |
| WO | 2016115003 A1 | 7/2016 |

* cited by examiner

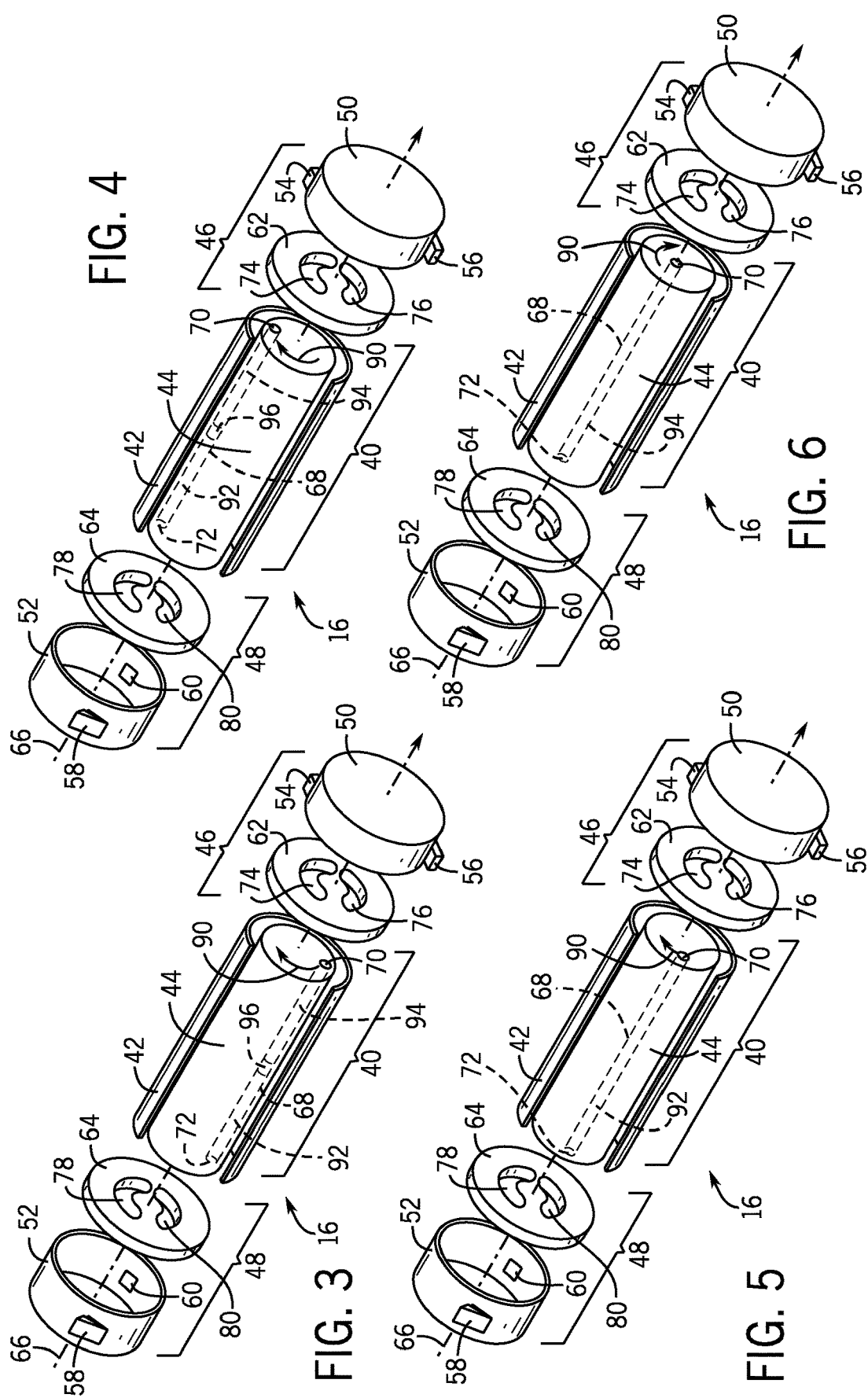

SYSTEM FOR USING PRESSURE EXCHANGER IN MUD PUMPING APPLICATION

CROSS REFERENCE TO RELATED APPLICATION

This application claims priority to and benefit of U.S. Patent Application No. 62/403,488, entitled "SYSTEM FOR USING PRESSURE EXCHANGER IN MUD PUMPING APPLICATION", filed Oct. 3, 2016, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The subject matter disclosed herein relates to fluid handling, and, more particularly, to systems and methods for pressurizing and pumping drilling fluids ("drilling mud") to a drilling rig to be sent down a drill string.

Drilling mud is used in oil and gas drilling applications to provide hydraulic power, cooling, well control (e.g., using the weight and pressure of the mud to control the well, which may encounter pressurized fluids in the formation), to cool the drilling head and to carry cuttings away from the cutting head. In drilling applications, drilling mud is typically pressurized (e.g., 5,000 to 7,500 PSI or more) and pumped using a mud pump to a drilling rig and down the drilling pipe to a cutting head via a drill string. The used drilling mud and the cuttings then flow back up through an annulus between the drilling pipe and a casing. However, in some embodiments, the drilling mud flow down through the annulus between the drilling pipe and the casing and then up the drilling pipe to the rig.

Drilling mud may include cuttings, clay, various minerals, aggressive chemicals, salts, and miscellaneous other components that may place stress on the mud pump, and in some cases shorten the lifespan of the mud pump. Accordingly, when selecting a mud pump, durability may be a driving factor.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 3 is an exploded perspective view of an embodiment of a PX in a first operating position;

FIG. 4 is an exploded perspective view of an embodiment of a PX in a second operating position;

FIG. 5 is an exploded perspective view of an embodiment of a PX in a third operating position;

FIG. 6 is an exploded perspective view of an embodiment of a PX in a fourth operating position;

DETAILED DESCRIPTION OF SPECIFIC EMBODIMENTS

Figure 1:
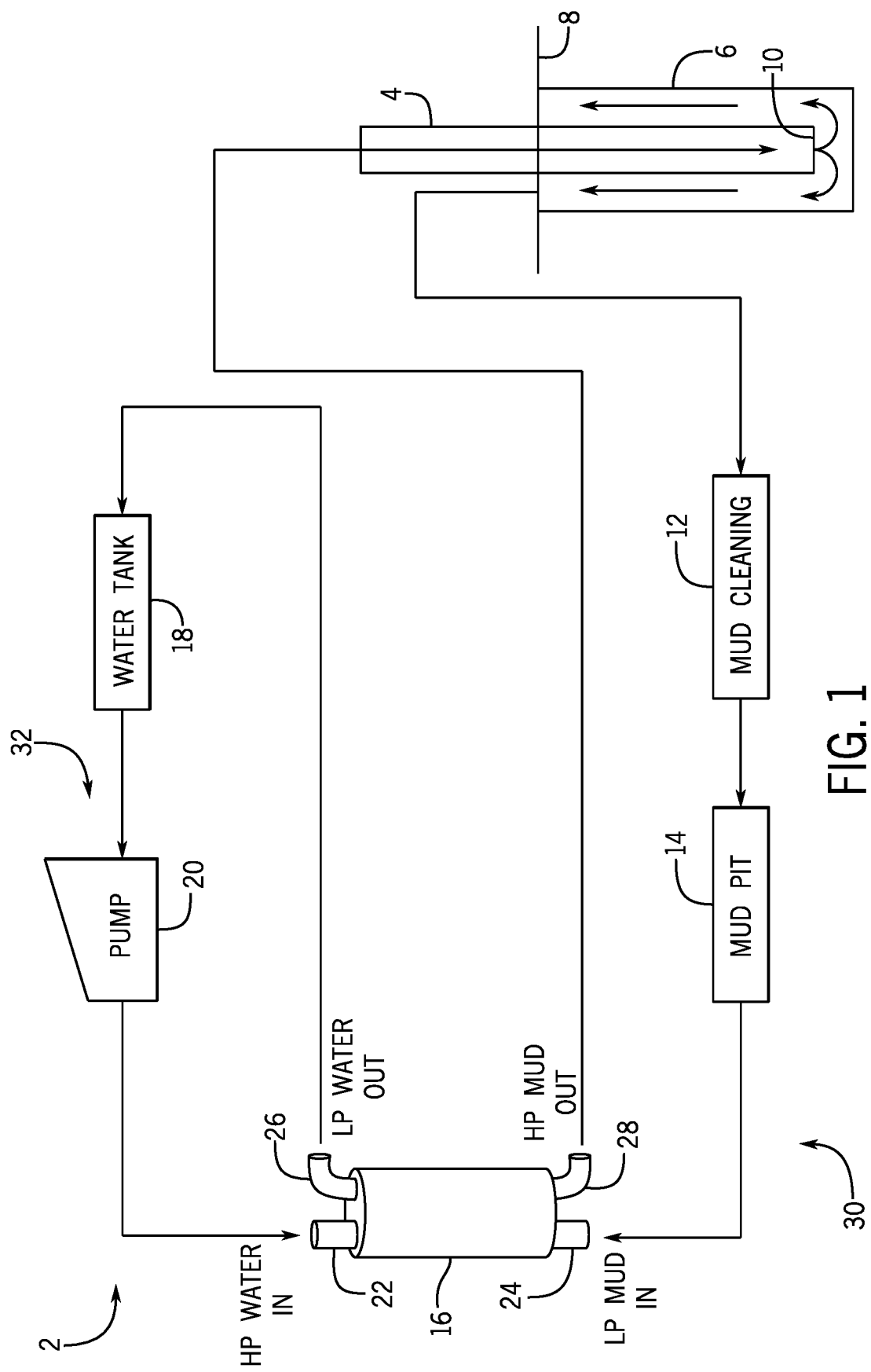
FIG. 1 is a schematic view of an embodiment of a drilling application.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In many drilling applications drilling mud is pressurized and pumped down the drill string to the cutting head to provide hydraulic power, cooling, well control (e.g., using the weight and pressure of the mud to control the well, which may encounter pressurized fluids in the formation), and displacement of the cuttings. The used drilling mud travels back up to the surface through an annulus between the drill string and a casing. The used drilling mud may then be cleaned and reused. Drilling mud may include cuttings, clay, various minerals, aggressive chemicals, salts, and miscellaneous other components that may place stress on the mud pump, which may shorten the lifespan of the mud pump.

As discussed in detail below, by pressurizing a clean fluid (e.g., water) with a pump and then using a hydraulic energy transfer system, such as a pressure exchanger (PX), to transfer work and/or pressure from the high pressure clean fluid to the drilling mud allows the drilling mud to be pumped and pressurized without running the drilling mud through the pump. In some embodiments, the hydraulic energy transfer system may be a rotating isobaric pressure exchanger that transfers pressure between a high pressure fluid (e.g., high pressure energizing clean fluid, such as pressurized water) and a low pressure fluid (e.g., drilling mud). The utilization of the PX eliminates the need to run the drilling mud through a mud pump, which may stress or damage the pump more than water. The PX is compact, durable, easy to maintain, and can easily be deployed with redundancy.

The PX may include one or more chambers (e.g., 1 to 100) to facilitate pressure transfer and equalization of pressures between volumes of first and second fluids. In some embodiments, the pressures of the volumes of first and second fluids may not completely equalize. Thus, in certain embodiments, the PX may operate isobarically, or the PX may operate substantially isobarically (e.g., wherein the pressures equalize within approximately +/−1, 2, 3, 4, 5, 6, 7, 8, 9, or 10 percent of each other). In certain embodiments, a first pressure of a first fluid (e.g., a high pressure energized clean fluid) may be greater than a second pressure of a second fluid (e.g., drilling mud). For example, the first pressure may be between approximately 5,000 kPa to 25,000 kPa, 20,000 kPa to 50,000 kPa, 40,000 kPa to 75,000 kPa, 75,000 kPa to 100,000 kPa or greater than the second pressure. Thus, the PX may be used to transfer pressure from a first fluid (e.g., high pressure energized clean fluid) at a higher pressure to a second fluid (e.g., drilling mud) at a lower pressure.

FIG. 1 is a schematic view of an embodiment of a drilling application 2. As illustrated, a drill string 4 extends through a casing 6 below a surface 8 of the earth, where a cutting head 10 drills into the earth. Drilling fluids ("drilling mud") are typically pressurized (e.g., 5,000 to 7,500 psi or more) and pumped down the drill string 4 to the cutting head 10 to provide hydraulic power, cooling, well control (e.g., using the weight and pressure of the mud to control the well, which may encounter pressurized fluids in the formation), and displacement of the cuttings. The drilling mud is then pumped up, away from the cutting head 10, and through the annulus between the drill string 4 and the casing 6. The used mud carries the cuttings away from the cutting head 10. In typical riser drilling applications, the used mud is pumped up through the annulus between the drill string and the casing back up to the surface 8. The used drilling mud may go through one or more cleaning systems 12 or processes (e.g., shale shaker, degasser, desander, desilter, centrifuge, etc.) and then be deposited in a mud pit 14.

Typically, drilling mud from the mud pit 14 is pressurized and pumped using a mud pump. However, clay, salt, and minerals in the drilling mud may put stress on a mud pump that may shorten its lifespan. In the illustrated embodiment, a PX 16 is used to pressurize and pump the drilling mud. Specifically, clean fluid (e.g., water) from a clean fluid supply 18 (e.g., a water tank) is pressurized (e.g., 5,000 to 7,500 psi or more) using a pump 20 and supplied to the high pressure (HP) inlet 22. The pump may be a triplex plunger pump with a discharge pulsation damper, or some other pump suitable for pumping clean fluids. Drilling mud from the mud pit 14 is supplied to the low pressure (LP) inlet. The PX 16 transfers pressure from the high pressure clean fluid to the low pressure drilling mud, outputting low pressure clean fluid through the LP outlet 26, and high pressure drilling mud through the HP outlet 28. Though FIG. 1 shows a single PX 16, it should be understood that a drilling application 2 may include multiple PXs 16, coupled to one another by plumbing or manifolds, which may have valves for switching PXs 16 online and offline. The clean fluid from the LP outlet 26 is deposited in the water tank 18. The drilling mud from the HP outlet 28 travels to and down the drill string 4.

Thus, the drilling application may include a drilling mud loop 30 and a clean fluid loop 32, which may only interact with one another, if at all, in the PX 16. The PX 16 has fewer moving parts and is generally better suited to processing drilling mud than the pump 20. Thus, because the pump 20 is pumping clean fluid (e.g., water) rather than drilling mud, the pump 20 undergoes less stress than a comparable pump in an embodiment in which the pump pumps drilling mud. In some embodiments, the pump 20 handling clean fluid rather than drilling mud may alter the pump 20 used in the system 2. For example, because the pump 20 processes water, rather than drilling mud, a pump that is less durable, but offers better performance or efficiency may be selected instead. Similarly, in some applications, the mud cleaning system 12 may be less thorough because the mud no longer needs to be clean enough to be processed by the pump 20.

Figure 2:
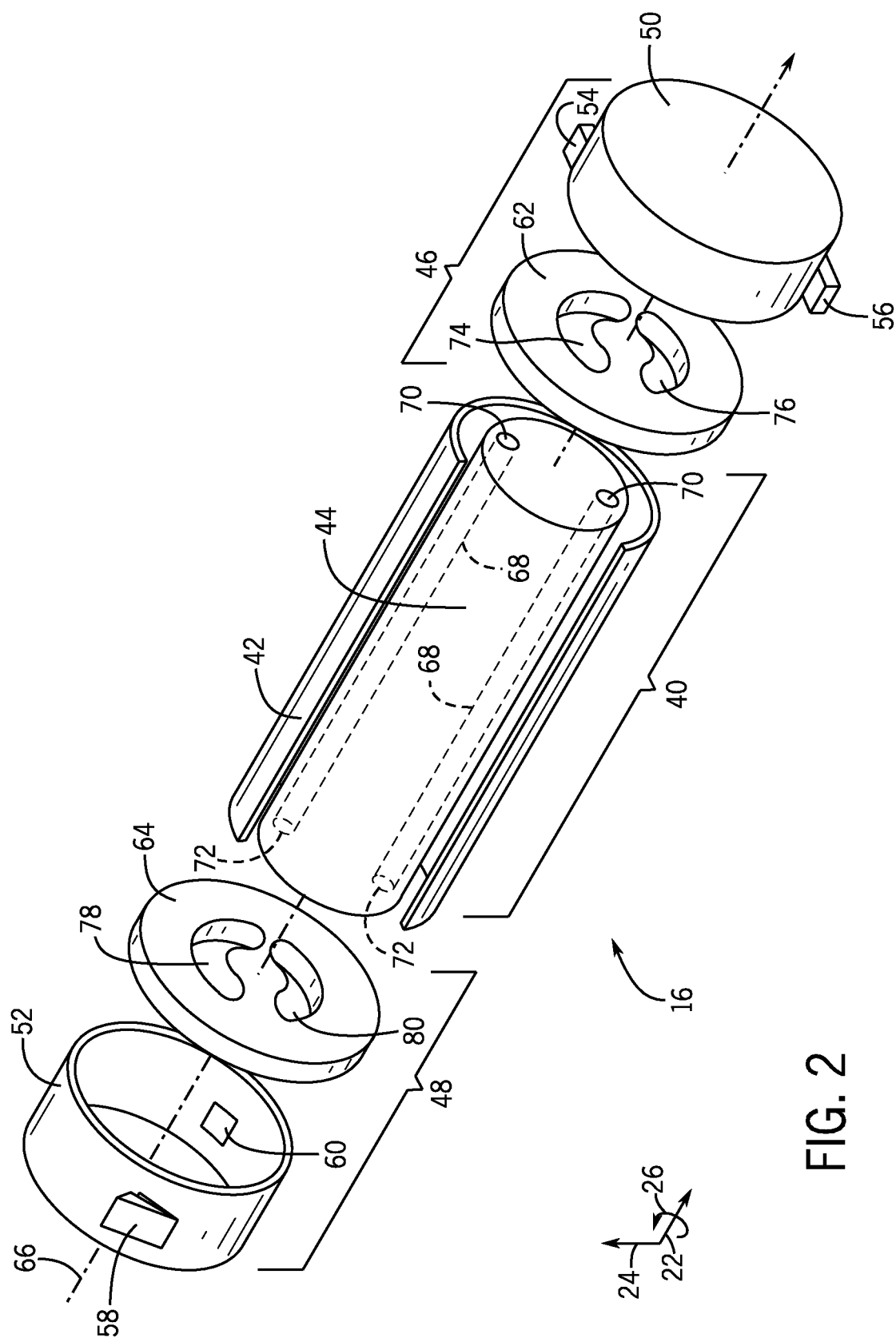
FIG. 2 is an exploded perspective view of an embodiment of a pressure exchanger (PX)

FIG. 2 is an exploded view of an embodiment of a rotary PX 16 that may be utilized in place of a mud pump in a drilling application, as described in detail below. As used herein, the PX 16 may be generally defined as a device that transfers fluid pressure between a high-pressure inlet stream and a low-pressure inlet stream at efficiencies in excess of approximately 50%, 60%, 70%, or 80% without utilizing centrifugal technology. In this context, high pressure refers to pressures greater than the low pressure. The low-pressure inlet stream of the PX 16 may be pressurized and exit the PX 16 at high pressure (e.g., at a pressure greater than that of the low-pressure inlet stream), and the high-pressure inlet stream may be depressurized and exit the PX 16 at low pressure (e.g., at a pressure less than that of the high-pressure inlet stream). Additionally, the PX 16 may operate with the high-pressure fluid directly applying a force to pressurize the low-pressure fluid, with or without a fluid separator between the fluids. Examples of fluid separators that may be used with the PX 16 include, but are not limited to, pistons, bladders, diaphragms and the like. In certain embodiments, isobaric pressure exchangers may be rotary devices. Rotary isobaric pressure exchangers (PXs) 16, such as those manufactured by Energy Recovery, Inc. of San Leandro, Calif., may not have any separate valves, since the effective valving action is accomplished internal to the device via the relative motion of a rotor with respect to end covers, as described in detail below with respect to FIGS. 2-7. Rotary PXs 16 may be designed to operate with internal pistons to isolate fluids and transfer pressure with little mixing of the inlet fluid streams. Reciprocating PXs 16 may include a piston moving back and forth in a cylinder for transferring pressure between the fluid streams. Any PX 16 or plurality of PXs 16 may be used in the disclosed embodiments, such as, but not limited to, rotary PXs, reciprocating PXs, or any combination thereof. While the discussion with respect to certain embodiments for measuring the speed of the rotor may refer to rotary PXs 16, it is understood that any PX 16 or plurality of PXs 16 may be substituted for the rotary PX 16 in any of the disclosed embodiments.

In the illustrated embodiment of FIG. 2, the PX 16 may include a generally cylindrical body portion 40 that includes a housing 42 and a rotor 44. The rotary PX 16 may also include two end structures 46 and 48 that include manifolds 50 and 52, respectively. Manifold 50 includes inlet and outlet ports 54 and 56 and manifold 52 includes inlet and outlet ports 60 and 58. For example, inlet port 54 may receive a high-pressure first fluid and the outlet port 56 may be used to route a low-pressure first fluid away from the PX 16. Similarly, inlet port 60 may receive a low-pressure second fluid and the outlet port 58 may be used to route a high-pressure second fluid away from the PX 16. The end structures 46 and 48 include generally flat end plates 62 and 64, respectively, disposed within the manifolds 50 and 52, respectively, and adapted for liquid sealing contact with the rotor 44. The rotor 44 may be cylindrical and disposed in the housing 42, and is arranged for rotation about a longitudinal axis 66 of the rotor 44. The rotor 44 may have a plurality of channels 68 extending substantially longitudinally through the rotor 44 with openings 70 and 72 at each end arranged symmetrically about the longitudinal axis 66. The openings 70 and 72 of the rotor 44 are arranged for hydraulic communication with the end plates 62 and 64, and inlet and outlet apertures 74 and 76, and 78 and 80, in such a manner that during rotation they alternately hydraulically expose liquid at high pressure and liquid at low pressure to the respective manifolds 50 and 52. The inlet and outlet ports 54, 56, 58, and 60, of the manifolds 50 and 52 form at least one pair of ports for high-pressure liquid in one end element 46 or 48, and at least one pair of ports for low-pressure liquid in the opposite end element, 48 or 46. The end plates 62 and 64, and inlet and outlet apertures 74 and 76, and 78 and 80 are designed with perpendicular flow cross sections in the form of arcs or segments of a circle.

With respect to the PX 16, an operator has control over the extent of mixing between the first and second fluids, which may be used to improve the operability of the PX 16. For example, varying the proportions of the first and second fluids entering the PX 16 allows the operator to control the amount of fluid mixing within the PX 16. Three characteristics of the PX 16 that affect mixing are: the aspect ratio of the rotor channels 68, the short duration of exposure between the first and second fluids, and the creation of a liquid barrier (e.g., an interface) between the first and second fluids within the rotor channels 68. First, the rotor channels 68 are generally long and narrow, which stabilizes the flow within the PX 16. In addition, the first and second fluids may move through the channels 68 in a plug flow regime with very little axial mixing. Second, in certain embodiments, at a rotor speed of approximately 1200 RPM, the time of contact between the first and second fluids may be less than approximately 0.15 seconds, 0.10 seconds, or 0.05 seconds, which again limits mixing of the streams. Third, a small portion of the rotor channel 68 is used for the exchange of pressure between the first and second fluids. Therefore, a volume of fluid remains in the channel 68 as a barrier between the first and second fluids. All these mechanisms may limit mixing within the PX 16.

In addition, because the PX 16 is configured to be exposed to the first and second fluids, certain components of the PX 16 may be made from materials compatible with the components of the first and second fluids. In addition, certain components of the PX 16 may be configured to be physically compatible with other components of the fluid handling system. For example, the ports 54, 56, 58, and 60 may comprise flanged connectors to be compatible with other flanged connectors present in the piping of the fluid handling system. In other embodiments, the ports 54, 56, 58, and 60 may comprise threaded or other types of connectors.

FIGS. 3-6 are exploded views of an embodiment of the rotary PX 16 illustrating the sequence of positions of a single channel 68 in the rotor 44 as the channel 68 rotates through a complete cycle, and are useful to an understanding of the rotary PX 16. It is noted that FIGS. 3-6 are simplifications of the rotary PX 16 showing one channel 68 and the channel 68 is shown as having a circular cross-sectional shape. In other embodiments, the rotary PX 16 may include a plurality of channels 68 (e.g., 2 to 100) with different cross-sectional shapes. Thus, FIGS. 3-6 are simplifications for purposes of illustration, and other embodiments of the rotary PX 16 may have configurations different from that shown in FIGS. 4-7. As described in detail below, the rotary PX 16 facilitates a hydraulic exchange of pressure between two liquids by putting them in momentary contact within a rotating chamber. In certain embodiments, this exchange happens at a high speed that results in very high efficiency with very little mixing of the liquids.

In FIG. 3, the channel opening 70 is in hydraulic communication with aperture 76 in endplate 62 and therefore with the manifold 50 at a first rotational position of the rotor 44. The opposite channel opening 72 is in hydraulic communication with the aperture 80 in endplate 64, and thus, in hydraulic communication with manifold 52. As discussed below, the rotor 44 rotates in the clockwise direction indicated by arrow 90. As shown in FIG. 3, low-pressure second fluid 92 passes through end plate 64 and enters the channel 68, where it pushes first fluid 94 out of the channel 68 and through end plate 62, thus exiting the rotary PX 16. The first and second fluids 92 and 94 contact one another at an interface 96 where minimal mixing of the liquids occurs because of the short duration of contact. The interface 96 is a direct contact interface because the second fluid 92 directly contacts the first fluid 94. In some embodiments, there may be a diaphragm or other barrier at the interface 96 to prevent mixing of the liquids.

In FIG. 4, the channel 68 has rotated clockwise through an arc of approximately 90 degrees, and outlet 72 is now blocked off between apertures 78 and 80 of end plate 64, and outlet 70 of the channel 68 is located between the apertures 74 and 76 of end plate 62 and, thus, blocked off from hydraulic communication with the manifold 50 of end structure 46. Thus, the low-pressure second fluid 92 is contained within the channel 68.

In FIG. 5, the channel 68 has rotated through approximately 180 degrees of arc from the position shown in FIG. 3. Opening 72 is in hydraulic communication with aperture 78 in end plate 64 and in hydraulic communication with manifold 52, and the opening 70 of the channel 68 is in hydraulic communication with aperture 74 of end plate 62 and with manifold 50 of end structure 46. The liquid in channel 68, which was at the pressure of manifold 52 of end structure 48, transfers this pressure to end structure 46 through outlet 70 and aperture 74, and comes to the pressure of manifold 50 of end structure 46. Thus, high-pressure first fluid 94 pressurizes and displaces the second fluid 92.

In FIG. 6, the channel 68 has rotated through approximately 270 degrees of arc from the position shown in FIG. 4, and the openings 70 and 72 of channel 68 are between apertures 74 and 76 of end plate 62, and between apertures 78 and 80 of end plate 64. Thus, the high-pressure first fluid 94 is contained within the channel 68. When the channel 68 rotates through approximately 360 degrees of arc from the position shown in FIG. 6, the second fluid 92 displaces the first fluid 94, restarting the cycle.

Figure 7:
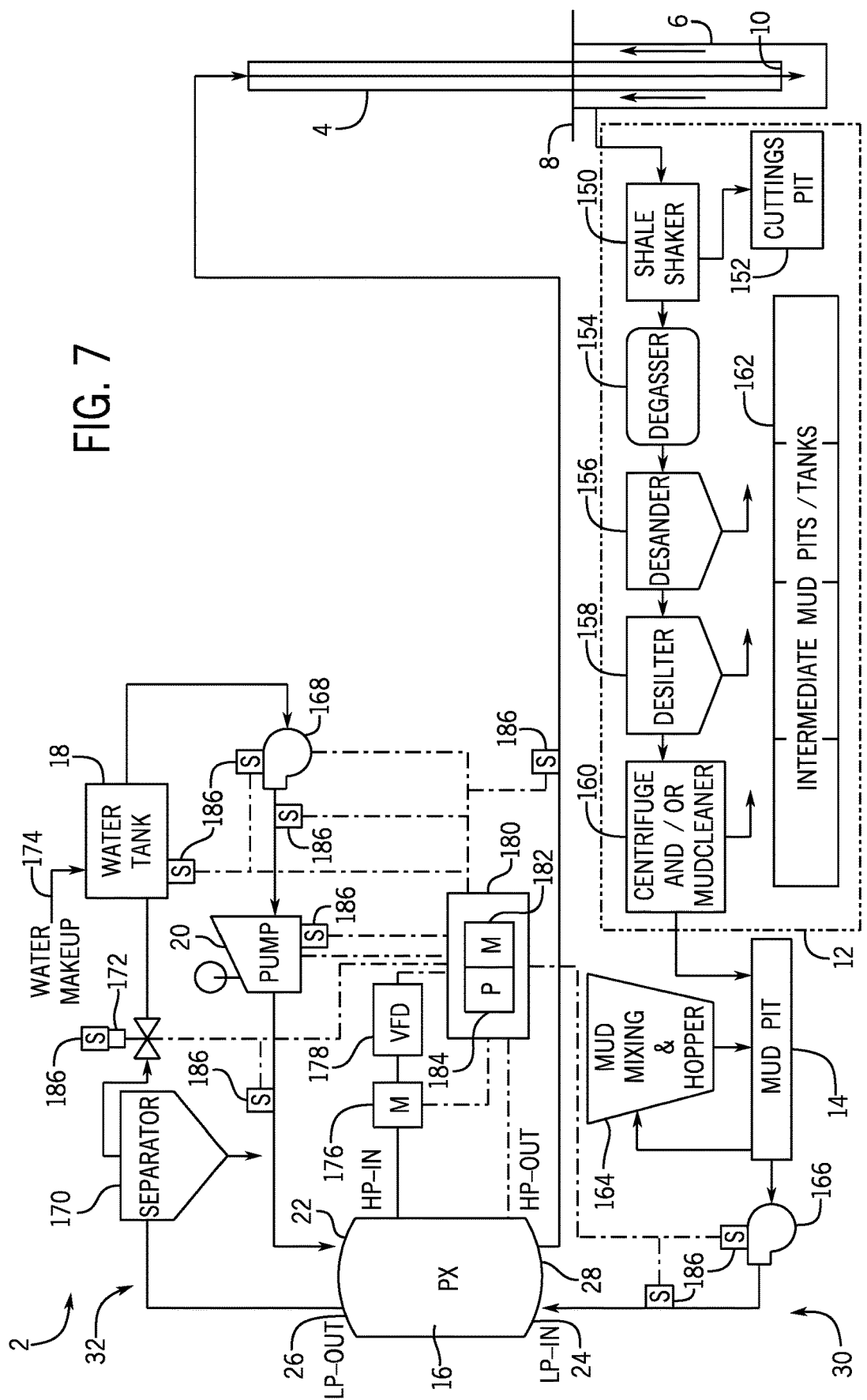
FIG. 7 is a schematic of an embodiment of the drilling application of FIG. 1.

FIG. 7 is a more detailed schematic of an embodiment of the drilling application 2 shown in FIG. 1. As previously discussed, used drilling mud exits the annulus between the drill string 4 and the casing 6 and enters the mud cleaning system 12. As shown, the mud cleaning system 12 may include a shale shaker 150 to separate cuttings from the used drilling mud. The cuttings may be deposited in a cuttings pit 152. As illustrated, the used drilling mud is then processed by a degasser 154, a desander 156, a desilter 158, and a centrifuge 160 and/or mud cleaner. It should be understood however, that the mud cleaning system 12 may include any combination of the previously mentioned components, in any order, or combinations with additional components. Further, the mud cleaning system 12 may include one or more intermediate mud pits 162 or tanks to store drilling mud between processes. The drilling mud may exit the mud cleaning system 12 and be deposited in the mud pit 14. In some embodiments, the mud loop 30 includes a mixer and a hopper 164 to keep the drilling mud in the mud pit 14 moving and mixed up, to add mud to the mud pit 14, to change the composition of the mud, or to increase flow rates. Though the mixer and hopper 164 in FIG. 7 is shown outside the dotted line that encompasses the mud cleaning system 12, in some embodiments, the mixer and hopper 164 may be considered a part of the mud cleaning system 12. A charge pump 166 (e.g., a centrifugal pump) may be used to supply drilling mud from the mud pit 14 to the LP inlet 24 of the PX 16.

Meanwhile, a charge pump 168 draws clean water from the water tank 18 and supplies clean water to the high pressure pump 20. The high pressure pump 20 pressurizes the clean water to 5,000-7,500 psi or more and pumps the water to the HP inlet 22 of the PX 16. As previously discussed, the PX 16 transfers pressure from the high pressure clean fluid to the low pressure drilling mud. High pressure drilling mud exits the PX 16 via the HP outlet 28 and is pumped down the drill string 4. Low pressure clean fluid exits the PX 16 via the LP outlet 26. Low pressure clean water exiting the PX 16 may go through a separator 170 to remove particulates from the clean water. As discussed in more detail below, in some embodiments (e.g., embodiments with lead flow), the clean water and the drilling mud may interact with one another within the PX 16. In such situations, the high pressure drilling mud may exit the PX 16 via the HP outlet 28 carrying some of the clean water. Similarly, the clean water may exit the PX 16 via the LP outlet 26 carrying particulate picked up from the drilling mud within the PX 16. Accordingly, the separator 170 may be used to remove the particulate from the clean water. In some embodiments, the separator 170 may use flocculants or other clumping agents to separate particulates from the water. As will be discussed in more detail later, the particulates removed from the clean water may be discarded or returned to the mud loop 30. In other embodiments, the clean water loop 32 may include other components for cleaning or treating the clean water.

In some embodiments, the flow of clean water between the PX 16 and the water tank may be controlled by controlling the operation of the PX 16 (e.g., via the charge pump 166). In other embodiments, the water loop may include a valve 172 (e.g., a flow control valve) for controlling the flow of clean water between the PX 16 and the water tank 18. As discussed above, in embodiments of the drilling application 2 with lead flow, clean water may be mixed with the drilling mud in the PX 16 and exit the HP outlet 28 with the drilling mud. Accordingly, in such an embodiment, some clean water may transition from the clean water loop 32 to the mud loop 30. In such an embodiment, a water makeup flow 174 may add water to the water tank 18 in order to maintain a relatively constant amount of water in the clean water loop 32. In some embodiments, the water makeup flow may also help provide a cooling effect by cooling the clean water loop.

In some embodiments, the PX 16 may be driven by a motor 176 (e.g., an electric or gas motor). The motor 176 may or may not be driven by a variable frequency drive (VFD) 178.

In some embodiments, the drilling application 2 may include a controller 180 for controlling operation of the mud loop 30 and the clean water loop 32. The controller 180 may control the PX 16, the high pressure pump 20, the charge pumps 166, 168, the valve 172, the motor 176, the VFD 178, any combination thereof, or other components within the system. For example, the controller may control flow rates (e.g., via valve position), pump speed, motor speed, VFD signals, etc. The controller 180 may include a memory component 182 for storing data and/or programs and a processor 184 for running programs stored on the memory 182. The processor 184 may include one or more general-purpose processors, one or more application specific integrated circuits, one or more field programmable gate arrays, or the like. The memory 182 may be any tangible, non-transitory, computer readable medium that is capable of storing instructions executable by the processor 184 and/or data that may be processed by the processor 184. The memory 182 may include volatile memory, such as random access memory, or non-volatile memory, such as hard disk drives, read-only memory, optical disks, flash memory, and the like.

The controller 180 may act based on inputs received from one or more sensors 186 disposed throughout the system and configured to sense flow rates, valve positions, pump speeds, densities, fluid levels, etc.

Though not shown, in some embodiments, the drilling application 2 may include various heat transfer or cooling components (e.g., heat exchangers, heat sinks, heating components, cooling components, etc.) to heat or cool mud in the mud loop 30 or water in the clean water loop 32.

Figure 8:
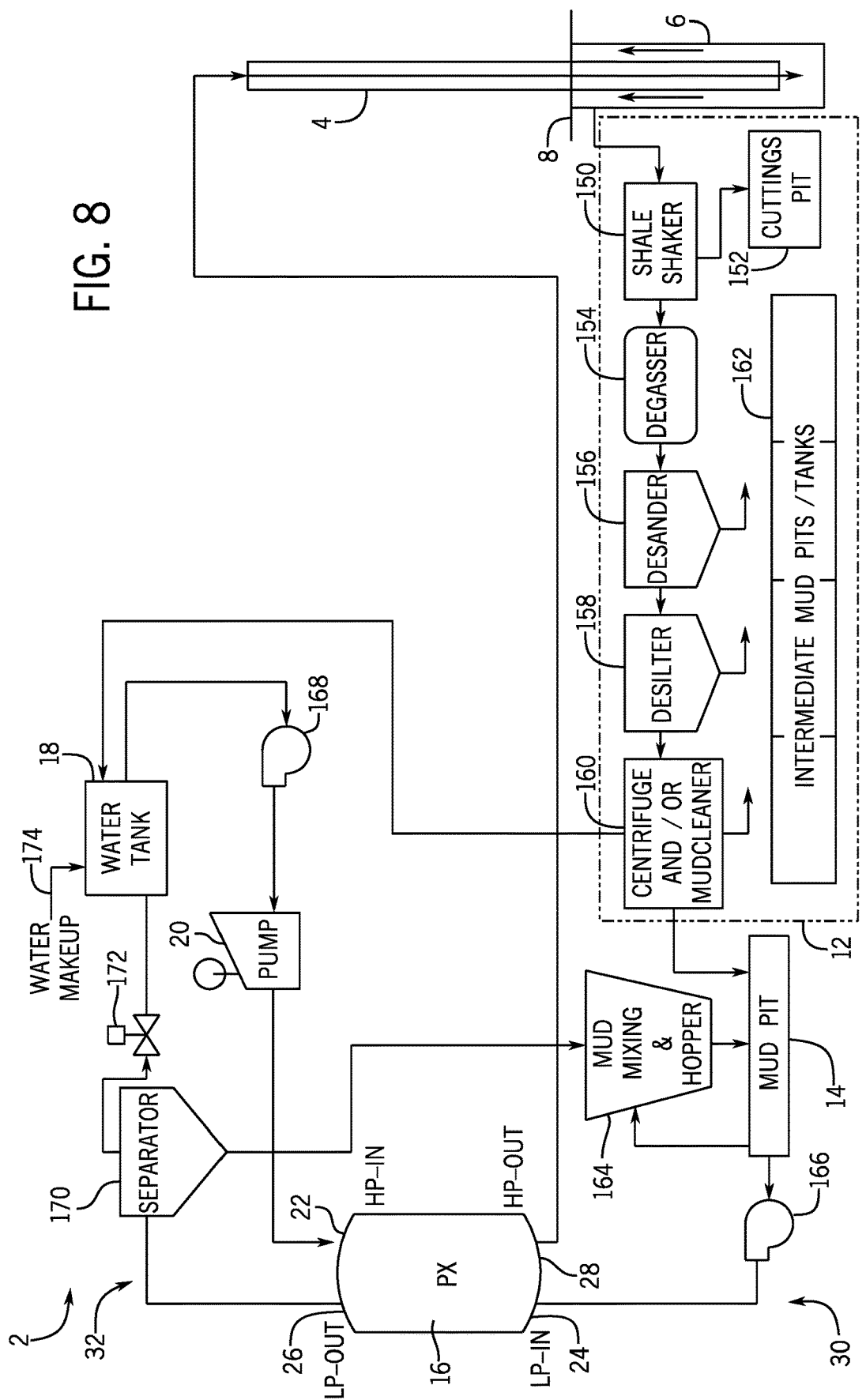
FIG. 8 is a schematic of an embodiment of the drilling application in which particulates from the separator are added to the mud loop, and water removed by the centrifuge is added to the water loop.

FIG. 8 is a schematic of an embodiment of the drilling application in which particulates separated from the clean water by the separator 170 are added to the mud loop 30 via the mud mixer or hopper 164 and water removed from the drilling mud by the centrifuge 160 is sent to the water tank 18. As described above, in some embodiments, the clean water and drilling mud may interact with one another in the PX 16. In such cases, the drilling mud may pick up some of the clean water and/or the clean water may pick up some particulates from the drilling mud. In such a case, the separator may be used to separate particulates from the clean water after the water exits the PX. In some embodiments the particulates may be discarded. In other embodiments, the particulates may be added to the drilling mud in the mud pit 14 and travel with the drilling mud through the mud loop 30.

Similarly, the centrifuge 160 of the mud cleaning system 12 may be used to separate (e.g., extract) water from the drilling mud. As shown, the extracted water may be added to the water tank 18. In other embodiments, the extracted water may be discarded.

Figure 9:
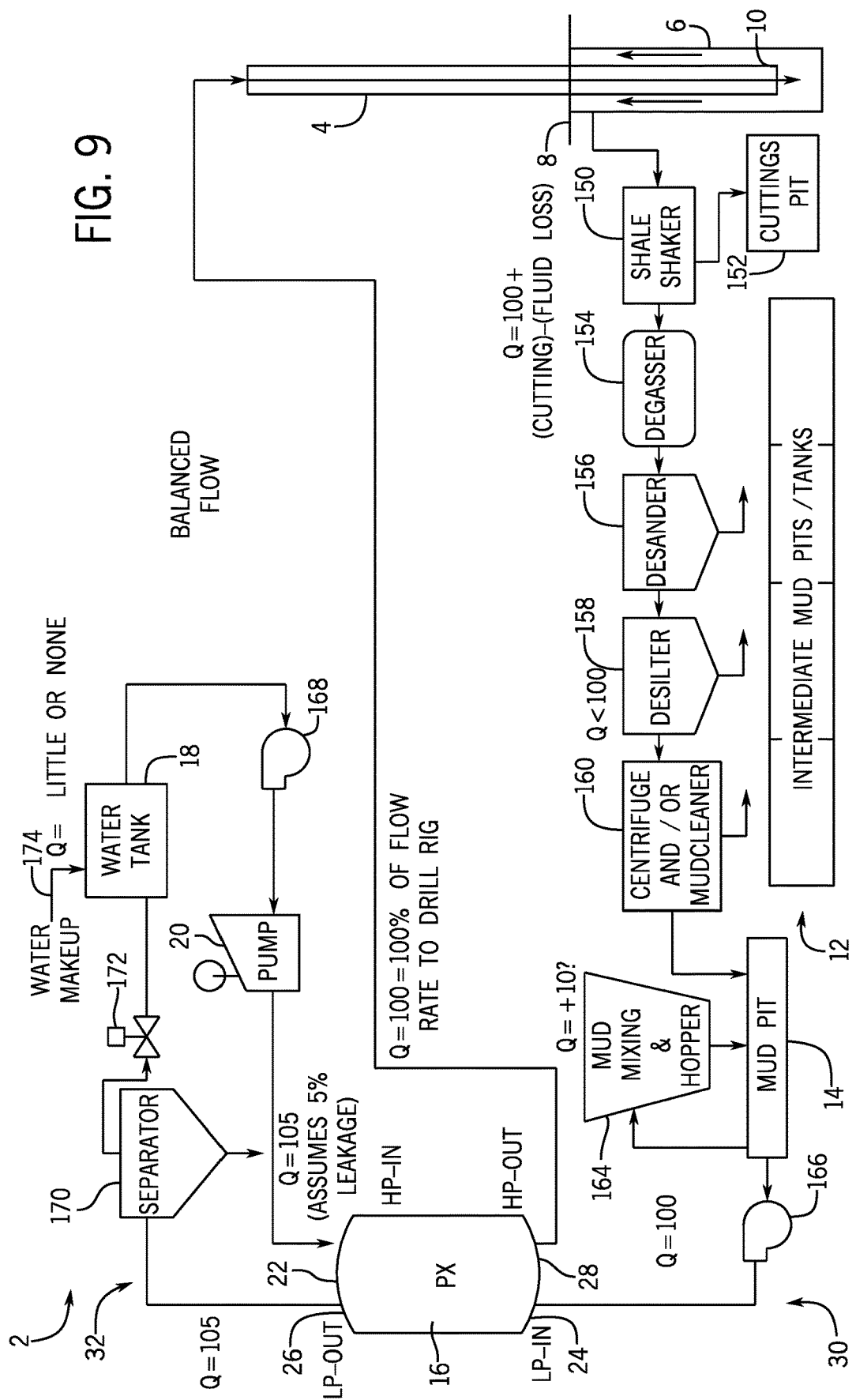
FIG. 9 is a schematic illustrating flow rates in an embodiment of the drilling application with balanced flow.

FIG. 9 is a schematic illustrating flow rates in an embodiment of the drilling application 2 with balanced flow. The flow of the drilling application 2 is balanced when the high pressure flow rate (i.e., the flow rate into the HP inlet 22 and out of the HP outlet 28) is substantially the same as the low pressure flow rate (i.e., the flow rate into the LP inlet 24 and out of the LP outlet 26). For example, the high pressure flow rate may be within 1%, 2%, 3%, 4%, 5%, 6%, 7%, 8%, 9%, 10%, 11%, 12%, 13%, 14%, 15%, or some other value, or the low pressure flow rate. As shown, the flow rates Q in each portion of the mud loop 30 and the clean water loop 32 are expressed as a percentage of the flow rate of drilling mud out of the HP outlet 28 of the PX 16 and to the drill string 4. As shown, the flow rate Q of the used drilling mud out of the casing 6 is 100, plus cuttings and minus any fluid losses. As the drilling mud goes through the mud cleaning system 12, the flow rate Q decreases. For example, drilling mud may exit the mud cleaning system 12 with a flow rate Q of 80, 85, 90, 95, or some other value. The mud mixer and hopper 164 may be used to increase the flow rate Q by 5%, 10%, 15%, 20%, or some other value such that drilling mud enters the PX 16 at the LP inlet 24 at a flow rate Q of 100.

Similarly, water may be pumped from the water tank and into the HP inlet 22 of the PX 16 at a flow rate Q of 105, assuming approximately 5% leakage or lubrication flow (e.g., fluid which migrates from the HP flow to the LP flow within the PX 16). Water exits the PX 16 at a flow rate Q of 105, goes through the separator, and is deposited in the water tank 18. In the balanced flow embodiment illustrated in FIG. 9, the flow rate Q of the water makeup flow 174 may be small, or in some cases, even zero. For example, the flow rate Q of the water makeup flow 174 may be 0, 1, 2, 3, 4, 5, 6, 7, 8, 9, 10, or some other value. In some embodiments, the water makeup flow 174 may be used to account for water lost to leakage.

Figure 10:
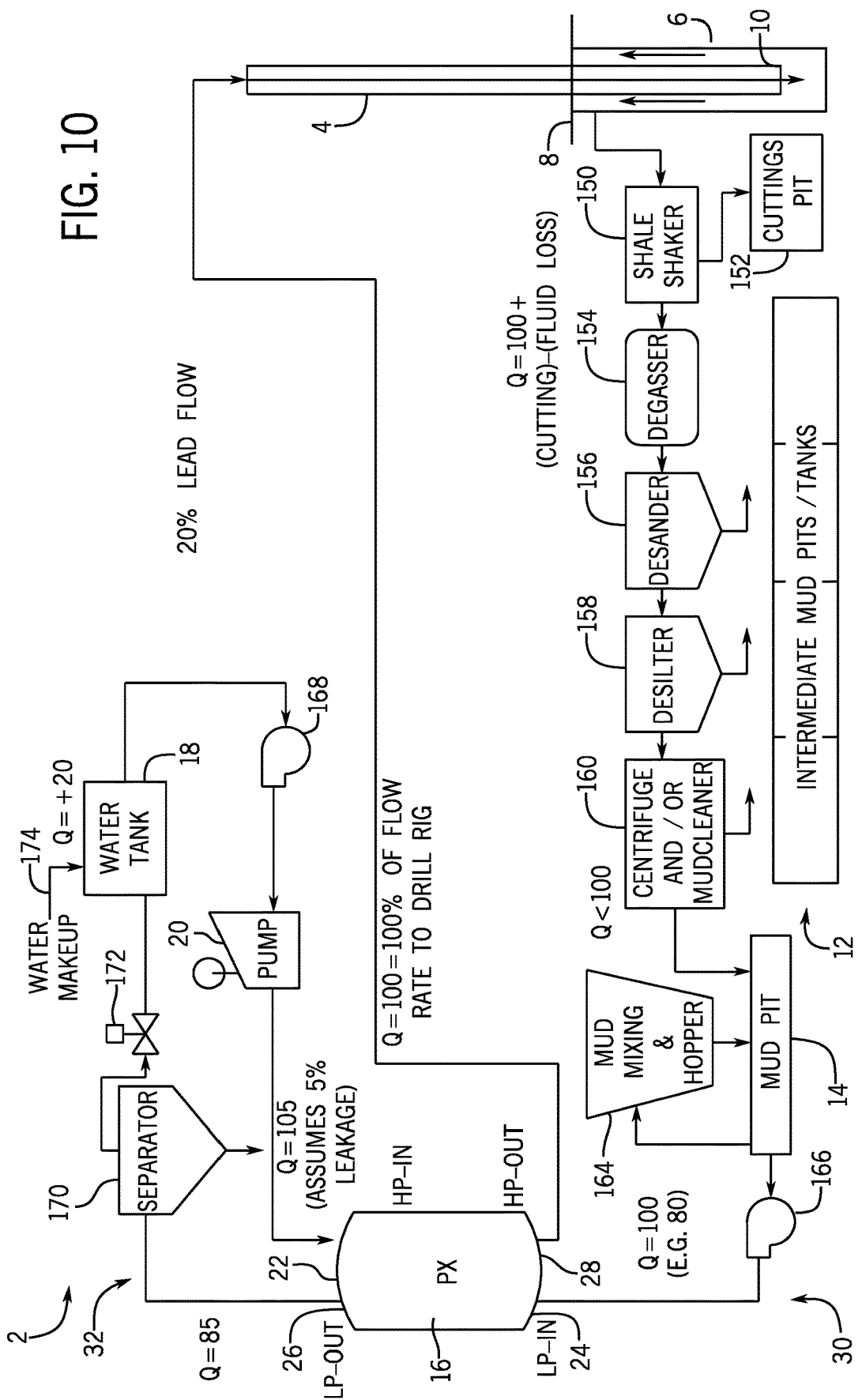
FIG. 10 is a schematic illustrating flow rates in an embodiment of the drilling application with 20% lead flow.

FIG. 10 is a schematic illustrating flow rates in an embodiment of the drilling application 2 with 20% lead flow (e.g., the HP flow rate is greater than the LP flow rate). As shown, the flow rate of the used drilling mud out of the casing 6 is 100, plus cuttings and minus any fluid losses. As the drilling mud goes through the mud cleaning system 12, the flow rate Q decreases. For example, drilling mud may exit the mud cleaning system 12 with a flow rate Q of 80, 85, 90, 95, or some other value. In the lead flow example, the mud mixer and hopper 164 are not used to increase the flow rate Q, such that drilling mud enters the PX 16 at the LP inlet 24 at a flow rate Q of less than 100. For example, drilling mud may enter the LP inlet 24 of the PX 16 at a flow rate Q of 70, 75, 80, 85, 90, or some other value. As the drilling mud travels through the PX, the drilling mud may take on some of the clean water such that the drilling mud exits the HP outlet 28 of the PX 16 at a flow rate Q of 100.

Similarly, water may be pumped from the water tank and into the HP inlet 22 of the PX 16 at a flow rate Q of 105, assuming approximately 5% leakage. Because the drilling mud takes on some of the clean water as it travels through the PX 16, water exits the LP outlet 26 of the PX 16 at a lower flow rate Q (e.g., 70, 75, 80, 85, 90, or some other value), goes through the separator, and is deposited in the water tank 18. Water may be added to the water tank 18 via the water makeup flow 174 to account for water taken on by the drilling mud in the PX 16. For example, the flow rate Q of the water makeup flow 174 may be 10, 15, 20, 25, 30, or some other value. The water makeup flow 174 may also be used to account for water that leaks to the drilling mud in the PX 16. In some embodiments, the water makeup flow 174 may also be used to cool the clean water loop.

Figure 11:
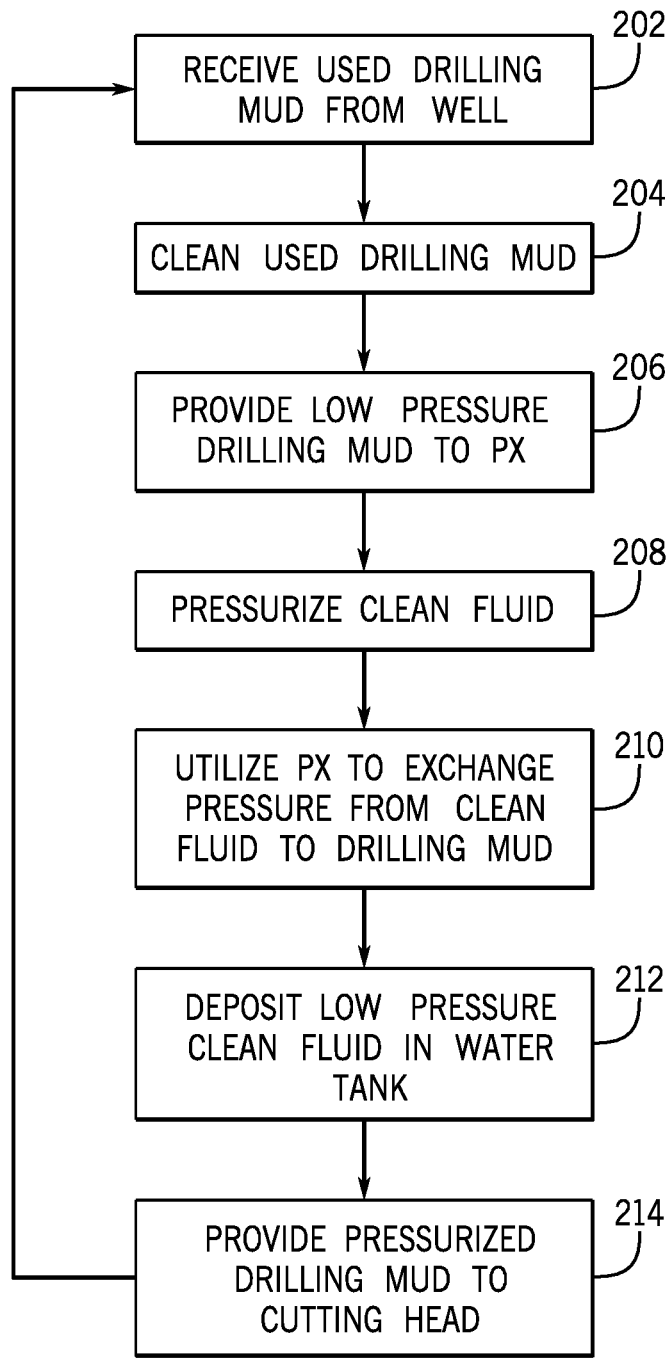
FIG. 11 is a flow chart of a process for pressurizing drilling mud.

FIG. 11 is a flow chart of a process for pressurizing drilling mud. In block 202, used drilling mud is received from the well (e.g., from the annulus between the drill string and the casing). In block 204, the used drilling mud may be cleaned. As described above, this may include shale shaking to separate the drilling mud from the cuttings, degassing, desanding, desilting, and running through a centrifuge to separate various components of the drilling mud. Once cleaned, the drilling mud may be deposited in a mud pit. In block 206, low pressure drilling mud is provided to the LP inlet of the PX. In block 208, the clean fluid (e.g., clean water) is pressurized using a pump and provided to the HP inlet of the PX. In block 210, the pressures are exchanged between the high pressure clean fluid and the low pressure drilling mud. Thus, the low pressure drilling mud is pressurized and the high pressure clean fluid is depressurized. The high pressure drilling mud exits the PX via the HP outlet. The low pressure clean fluid exits the PX via the low pressure outlet. In block 212, the low pressure clean fluid is deposited in the water tank or other containment device. In some embodiments (e.g., lead flow) a water make up flow may supply supplemental water to the water tank in order to make up for water lost to leakage or taken on by the drilling mud in the PX. In block 214 the pressurized drilling mud is provided to the cutting head via the drill string. The drilling mud provides hydraulic power, cooling, well control (e.g., using the weight and pressure of the mud to control the well, which may encounter pressurized fluids in the formation), and also carries cuttings away from the cutting head as the drilling mud is pumped back up to the surface in the annulus between the casing and the drill string.

Using one or more PXs to transfer pressure from a clean fluid to drilling mud for mud pumping in a drilling application means that the high pressure pump pumps clean fluid, rather than drilling mud. Thus, the high pressure pump does not have to withstand the stress caused by cuttings, clay, various minerals, aggressive chemicals, salts, and miscellaneous other components in the drilling mud. The disclosed techniques may result in increased lifespan and increased efficiency of the high pressure pump relative to typical systems in which the high pressure pump pumps drilling mud. Additionally, in some configurations, because the pump is pumping clean fluid instead of drilling mud, a higher performance or more efficient pump may be chosen because durability is not as much of a concern. Similarly, because the pump is not pumping drilling mud, in some instances the mud cleaning process may be less thorough, thus potentially saving time and money.

While the disclosed subject matter may be susceptible to various modifications and alternative forms, specific embodiments have been shown by way of example in the drawings and have been described in detail herein. However, it should be understood that the disclosed subject matter is not intended to be limited to the particular forms disclosed. Rather, the disclosure is to cover all modifications, equivalents, and alternatives falling within the spirit and scope of the disclosure as defined by the following appended claims.

What is claimed is:

1. A system comprising:
   a fluid tank configured to hold a first fluid;
   a pump configured to draw the first fluid from the fluid tank and to pressurize the first fluid; and
   a pressure exchanger (PX) configured to receive a second fluid, to receive the first fluid that has been pressurized, to utilize the first fluid to pressurize the second fluid for transport to a well, and to discharge the first fluid, wherein the first fluid subsequent to being discharged is routed to the fluid tank, wherein the first fluid is circulated via a first fluid loop through the fluid tank, the pump, and the PX, and wherein the second fluid is circulated via a second fluid loop through the PX and the well.

2. The system of claim 1, comprising:
   a mud pit configured to store the second fluid to be supplied to the PX.

3. The system of claim 2, comprising a cleaning system configured to clean the second fluid and deposit the second fluid that has been cleaned in the mud pit.

4. The system of claim 3, wherein the cleaning system comprises a shale shaker, a degasser, a desander, a desilter, a centrifuge, or a combination thereof.

5. The system of claim 3, wherein the cleaning system comprises a mixer and hopper configured to stir the second fluid in the mud pit.

6. The system of claim 3, comprising a separator configured to:
   receive the first fluid discharged from the PX;
   remove particulates from the first fluid discharged by the PX; and
   output the first fluid to the fluid tank.

7. The system of claim 6, wherein the separator is configured to output the particulates removed from the first fluid to the cleaning system.

8. The system of claim 7, wherein the cleaning system comprises a centrifuge configured to remove the first fluid from the second fluid and to output the first fluid to the fluid tank.

9. The system of claim 1, wherein a first flow rate of the first fluid that has been pressurized into the PX is substantially equal to a second flow rate of the second fluid into the PX.

10. The system of claim 1, wherein a first flow rate of the first fluid that has been pressurized into the PX is greater than a second flow rate of the second fluid into the PX.

11. The system of claim 10, wherein the first flow rate of the first fluid that has been pressurized into the PX is approximately 120% of the second flow rate of the second fluid into the PX.

12. The system of claim 1, wherein the first fluid loop is a water loop that includes the fluid tank, the pump, and the PX.

13. The system of claim 12, wherein the water loop is configured to remove particulates from the first fluid discharged from the PX before depositing the first fluid in the fluid tank.

14. The system of claim 13, wherein the water loop comprises a separator that removes the particulates from the first fluid discharged from the PX.

15. The system of claim 14, wherein the second fluid loop is a mud loop that includes the PX and the well, wherein the particulates removed from the first fluid discharged from the PX by the separator are output to the mud loop.

16. The system of claim 15, wherein the mud loop comprises a centrifuge configured to remove the first fluid from the second fluid and output the first fluid to the water loop.

17. A pressure exchanger (PX), comprising:
   a low pressure inlet port configured to receive a first fluid from a drilling application, wherein the low pressure inlet port comprises a first connector configured to attach to a first loop, wherein the first fluid is to be circulated via the first loop through the PX and a well;
   a high pressure inlet port configured to receive a second fluid that has been pressurized, wherein the second fluid is drawn from a fluid tank by a pump, wherein the high pressure inlet port comprises a second connector configured to attach to a second loop, and wherein the second fluid is to be circulated via the second loop through the fluid tank, the pump, and the PX;
   a low pressure outlet port configured to output the second fluid, wherein the second fluid that has been output is routed to the fluid tank, wherein the low pressure outlet port comprises a third connector configured to attach to the second loop; and
   a high pressure outlet port configured to output the first fluid for transport to the well, wherein the high pressure outlet port comprises a fourth connector configured to attach to the first loop, and wherein the PX is configured to utilize the second fluid to pressurize the first fluid.

18. The PX of claim 17, comprising:
   first and second end structures at respective first and second ends of the PX;
   a rotor disposed between the first and second end structures; and
   a housing disposed about the rotor.

19. The PX of claim 18, wherein the rotor comprises a plurality of channels extending longitudinally through the rotor.

20. The PX of claim 19, wherein the first and second end structures each comprise a manifold and an end plate disposed within the manifold, wherein the end plate is in fluid communication with the plurality of channels.

* * * * *